(12) United States Patent
Koshiishi

(10) Patent No.: US 12,467,944 B2
(45) Date of Patent: Nov. 11, 2025

(54) SOCKET AND INSPECTION SOCKET

(71) Applicant: Enplas Corporation, Saitama (JP)

(72) Inventor: Kazutaka Koshiishi, Saitama (JP)

(73) Assignee: Enplas Corporation, Saitama (JP)

( * ) Notice: Subject to any disclaimer, the term of this patent is extended or adjusted under 35 U.S.C. 154(b) by 201 days.

(21) Appl. No.: 18/455,961

(22) Filed: Aug. 25, 2023

(65) Prior Publication Data

US 2025/0067772 A1 Feb. 27, 2025

(51) Int. Cl.
*G01R 1/04* (2006.01)

(52) U.S. Cl.
CPC .................. *G01R 1/0441* (2013.01)

(58) Field of Classification Search
CPC .................................. G01R 1/0441
See application file for complete search history.

(56) References Cited

U.S. PATENT DOCUMENTS

| | | | |
|---|---|---|---|
| 5,018,659 A * | 5/1991 | Klomp | C04B 41/88 228/124.1 |
| 8,758,066 B2 | 6/2014 | Zhou | |
| 11,171,434 B2 * | 11/2021 | Narumi | H01R 12/714 |
| 11,293,944 B2 * | 4/2022 | Nakamura | H05K 7/1061 |
| 2007/0145991 A1 * | 6/2007 | Yoshida | G01R 1/045 324/755.01 |
| 2012/0019277 A1 * | 1/2012 | Kazama | F16F 1/04 324/755.05 |
| 2013/0203298 A1 * | 8/2013 | Zhou | G01R 1/06722 439/700 |
| 2020/0006882 A1 * | 1/2020 | Isagoda | G01R 31/26 |
| 2020/0141975 A1 * | 5/2020 | Hironaka | G01R 1/045 |
| 2020/0366018 A1 * | 11/2020 | Koshiishi | G01R 1/045 |
| 2022/0011345 A1 * | 1/2022 | Inuma | G01R 1/06722 |
| 2022/0357361 A1 * | 11/2022 | Baek | G01R 1/0433 |
| 2024/0329080 A1 * | 10/2024 | Elmadbouly | G01R 1/045 |

* cited by examiner

*Primary Examiner* — Paresh Patel
(74) *Attorney, Agent, or Firm* — Shih IP Law Group, PLLC

(57) ABSTRACT

A socket electrically connecting a first electric component and a second electric component together includes: a contact pin that electrically connects a ground terminal of the first electric component and a ground terminal of the second electric component; and a base part that includes a through hole into which the contact pin is inserted so as to be in contact with the inner wall, in which a part of the base part is formed of an insulator, and a conductive film is formed on the inner wall of the through hole in the base part formed of an insulator.

5 Claims, 2 Drawing Sheets

SOCKET AND INSPECTION SOCKET

TECHNICAL FIELD

The present invention relates to a socket and an inspection socket.

BACKGROUND ART

An IC socket has been known as a socket for electrically connecting an electric component such as an IC package packaging an integrated circuit (IC) to an external electric component (e.g., wiring board), for example. The IC socket is used, for example, to inspect electric properties of the IC package when shipping inspection is performed on the IC package.

The IC socket includes a contact pin in a base part for electrically connecting the IC package and the wiring board together, the IC package is mounted on the base part on the upper surface side, and the wiring board is attached to the base part on the lower surface side. The contact pin is provided so as to penetrate the base part, the upper end of the contact pin is electrically connected to a terminal of the IC package, and the lower end thereof is electrically connected to a terminal of the wiring board (e.g., see Patent Literature (hereinafter, referred to as PTL) 1).

Some IC sockets include coaxial contact pins. These IC sockets are configured so that through holes are provided in a ground-connected metal base part, and into the through holes, contact pins for signal transmission are inserted through insulation members (e.g., see PTL 1). Thus, the contact pins form a coaxial line with the inner wall surface of the through holes in the metal base part.

CITATION LIST

Patent Literature

PTL 1
U.S. Pat. No. 8,758,066

SUMMARY OF INVENTION

Technical Problem

A coaxial type IC socket currently distributed to the market is typically configured to include through holes in a metal (in particular, aluminum) base part, and contact pins are inserted into the through holes. In such a configuration, the metal base part keeps ground potential through direct contact with a ground pin, which is a contact pin electrically connected to a ground terminal of an IC package and/or a wiring board.

The ground pin and the inner wall of the through hole make strong contact with each other when the ground pin is tilted, for example. In a case where a side surface of the ground pin (contact pin) is formed of gold, for example, and the base part is formed of aluminum, for example, gold and aluminum come into contact with each other at the contacting point of the ground pin and the inner wall of the through hole. However, in a case where the base part is formed of metal that is likely to oxidize, such as aluminum, an oxidized film is formed also on the inner wall of the through hole, which causes a problem in that a resistance value at the contacting point increases.

An object of the present invention is to provide a socket and an inspection socket each capable of reducing a resistance value at the contacting point between a ground pin and a base part.

Solution to Problem

A socket according to the present invention is a socket electrically connecting a first electric component and a second electric component together, and includes:
 a contact pin that electrically connects a ground terminal of the first electric component and a ground terminal of the second electric component; and
 a base part that includes a through hole into which the contact pin is inserted so as to be in contact with the inner wall, in which
 a part of the base part is formed of an insulator, and
 a conductive film is formed on the inner wall of the through hole in the base part formed of an insulator.

An inspection socket according to the present invention is an inspection socket used for inspecting electric properties of the first electric component, and includes the above-described socket.

Advantageous Effects of Invention

According to the present invention, it is possible to reduce a resistance value at the contacting point between a ground pin and a base part.

DESCRIPTION OF EMBODIMENTS

Hereinafter, an embodiment of the present invention will be described in detail with reference to the accompanying drawings.

In the present embodiment, an inspection socket for an inspection apparatus that inspects electric properties of an electric component will be exemplified as a socket. This inspection apparatus performs various tests on electric components to be inspected. For example, the apparatus checks whether an electric component appropriately operates in the same environment as the actual use environment of the electric component or in an environment where a load greater than that in the actual environment is applied.

Further, the socket according to the present embodiment is an IC socket whose inspection target is an IC package, but an electric component to be inspected by the socket may be an electric component different from the IC package. The IC is an electronic circuit and includes transistors, resistances, capacitors, and inductors interconnected on a silicon substrate, for example.

Figure 1:
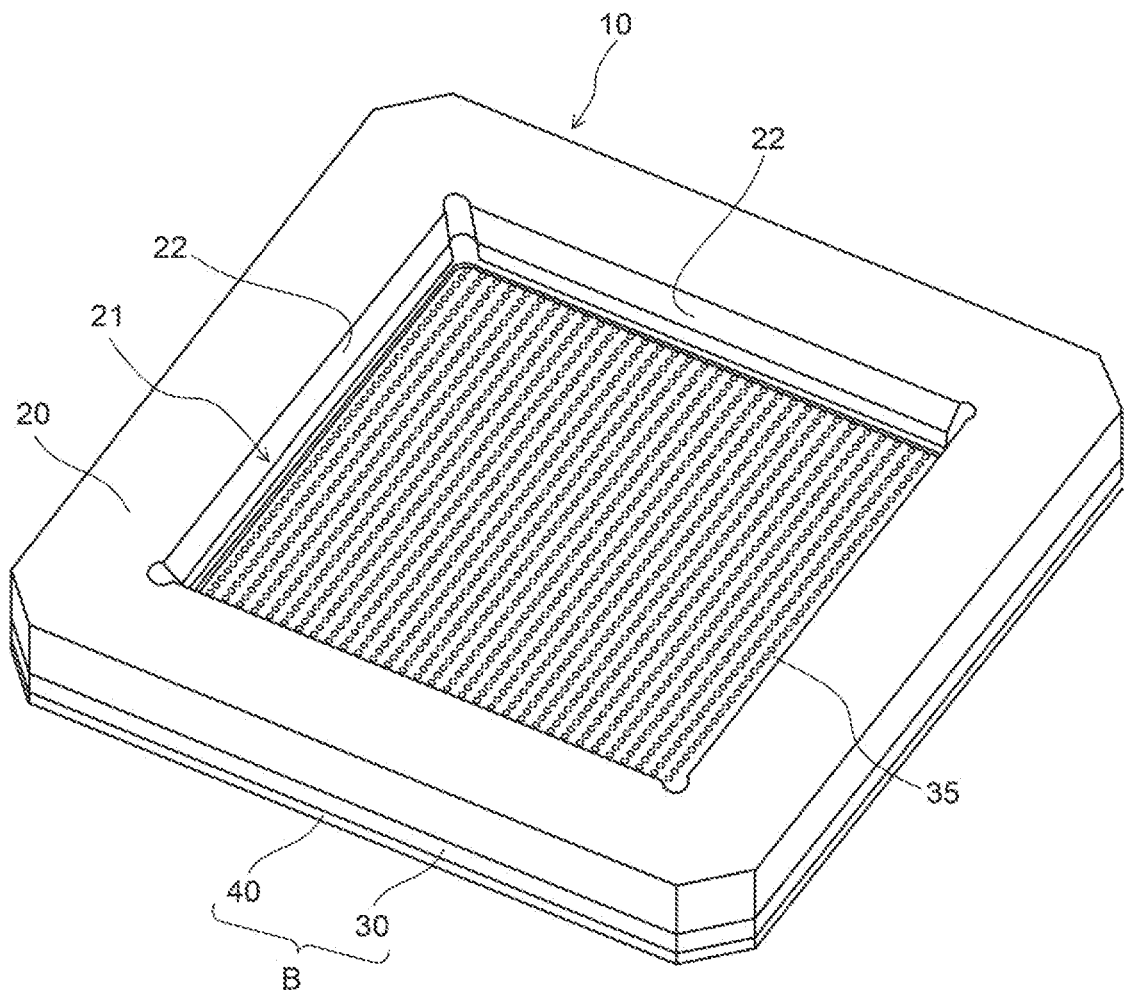
FIG. 1 is a perspective view of a socket according to an embodiment of the present invention, and illustrates an upper surface side of the socket.
Figure 2:
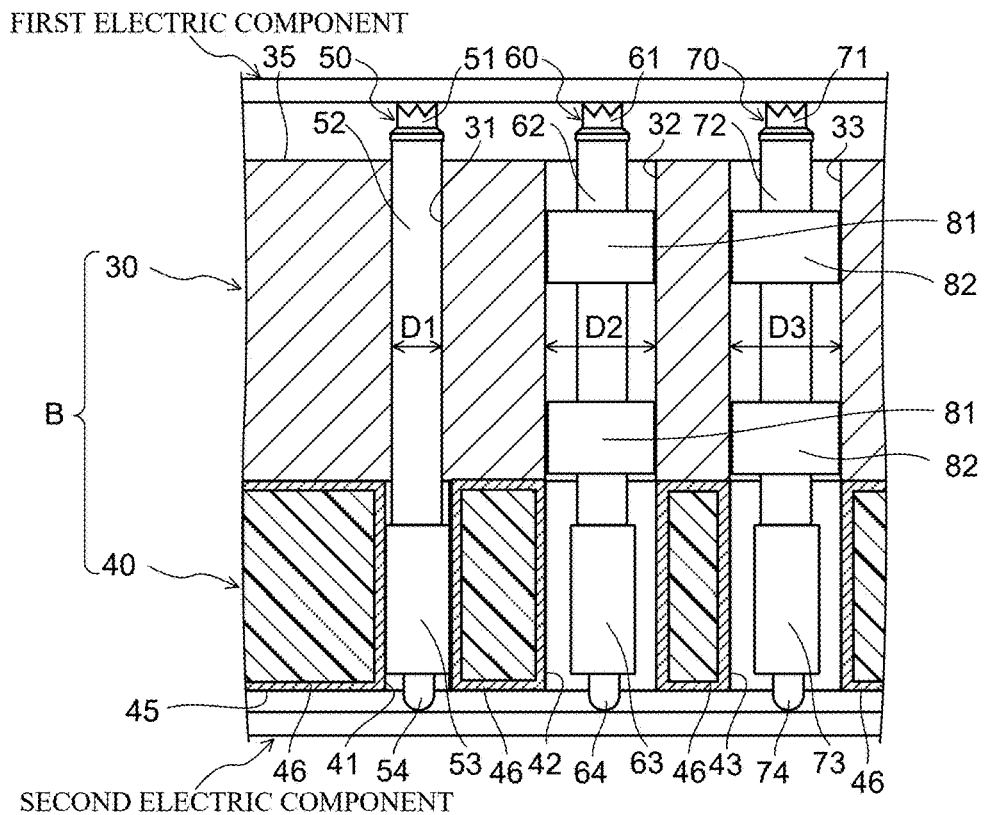
FIG. 2 is a cross-sectional view of a base part of the socket illustrated in FIG. 1.
Figure 3:
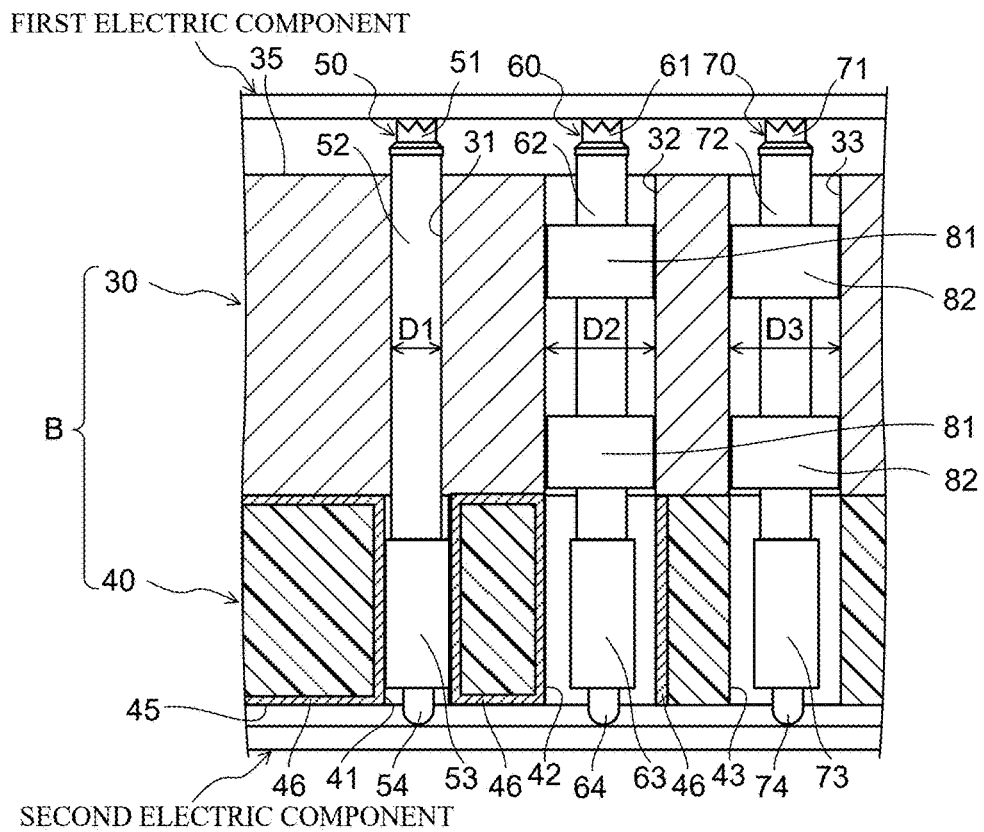
FIG. 3 is a cross-sectional view of a variation of the base part of the socket illustrated in FIG. 2.

FIG. 1 is a perspective view of IC socket 10 according to the present embodiment, and illustrates an upper surface side of IC socket 10. FIG. 2 is a cross-sectional view of base part B of IC socket 10 illustrated in FIG. 1. FIG. 3 is a cross-sectional view of a variation of base part B of IC socket 10 illustrated in FIG. 2.

(IC Socket)

IC socket 10 includes base part B on which an IC package (not illustrated) is placed, and frame part 20 placed on the outer side of upper surface 35 of upper base part 30 (first base part in the present invention) constituting base part B. The inner side of frame part 20 functions as housing part 21 housing the IC package. Note that, in the present embodiment, a thickness direction of base part B is referred to as an up-down direction, and in the following description, the terms "up" and "down" will indicate the up and down in this up-down direction.

The IC package is an exemplary first electric component in the present invention. In the present embodiment, an IC package of a Ball Grid Array (BGA) type, a Land Grid Array (LGA) type, or the like can be applied as the IC package.

A wiring board (not illustrated) is attached to lower surface 45 of lower base part 40 (second base part in the present invention) constituting base part B. The wiring board is an exemplary second electric component in the present invention. In the present embodiment, the wiring board is a wiring board of the inspection apparatus for performing the above-described various tests.

(Frame Part)

Frame part 20 is a frame body in which the central portion is opened in the up-down direction and the opening portion is surrounded by frame part 20, and constitutes an outer peripheral portion of housing part 21. In the present embodiment, the shape of the opening portion is a rectangular shape, but can be appropriately changed depending on the shape of the IC package to be housed.

On the inner peripheral side of frame part 20, that is, on the inner wall of housing part 21, guide part 22 for guiding the IC package to the correct position in housing part 21 is provided. Since a known technique can be applied as guide part 22 guiding the IC package to the correct position in housing part 21, the detailed description is omitted herein.

The IC package is guided by guide part 22 to the correct position in housing part 21. The IC package housed in housing part 21 is pressed downward by a pressing member (not illustrated) or the like. By this pressing, terminals of the IC package, such as solder balls, come into contact with upper plungers 51, 61, and 71 of contact pins 50, 60, and 70 (to be described later) placed in base part B.

Further, the wiring board is attached to the lower surface of base part B (lower surface 45 of lower base part 40) so that the terminals of the wiring board is in contact with lower plungers 54, 64, and 74 of contact pins 50, 60, and 70 placed in base part B.

Thus, IC socket 10 electrically connects terminals of the IC package housed in housing part 21 and terminals of the wiring board attached to the lower surface of base part B with each other by housing the IC package in housing part 21 and pressing the IC package downward.

(Base Part)

Base part B includes upper base part 30 on the IC package side and lower base part 40 on the wiring board side. Upper base part 30 and lower base part 40 are each a planar member having a predetermined thickness. In the thickness direction of base part B, upper base part 30 is placed on the upper side where the IC package is housed, and lower base part 40 is placed on the lower side where the wiring board is attached.

Upper base part 30 placed on the upper side constitutes a bottom portion of housing part 21, and upper surface 35 of upper base part 30 serves as a bottom surface of housing part 21.

Upper base part 30 includes through holes 31, 32, and 33 penetrating in the up-down direction. The upper side of contact pin 50 for grounding (hereinafter, referred to as a ground pin) is inserted into through hole 31 and placed so that the end portion of upper plunger 51 is exposed above upper surface 35.

The upper side of contact pin 60 for signals (hereinafter, referred to as a signal pin) is inserted into through hole 32 through insulation sleeve 81 to be described later and placed so that the end portion of upper plunger 61 is exposed above upper surface 35. Insulation sleeve 81 is placed in through hole 32, so that a diameter D2 of through hole 32 is configured to have a large diameter compared with a diameter D1 of through hole 31.

The upper side of contact pin 70 for power supply (hereinafter, referred to as a power pin) is inserted into through hole 33 through insulation sleeve 82 to be described later and placed so that the end portion of upper plunger 71 is exposed above upper surface 35. Insulation sleeve 82 is placed in through hole 33, so that a diameter D3 of through hole 33 is configured to have a large diameter compared with the diameter D1 of through hole 31.

Note that, in FIGS. 2 and 3, one ground pin 50 and through hole 31, one signal pin 60 and through hole 32, and one power pin 70 and through hole 33 are illustrated, but they are disposed corresponding to the number, arrangement, and/or the like of terminals of the IC package.

Upper base part 30 is formed of metal such as aluminum, for example. Ground pin 50 is inserted into through hole 31 and placed so that upper barrel 52, which will be described later, is in contact with the inner wall surface of through hole 31. On the inner wall surface of through hole 31, the metal constituting upper base part 30 is exposed, so that ground pin 50 is electrically connected to upper base part 30 to keep ground potential of upper base part 30.

The metal constituting upper base part 30 is also exposed on the inner wall surface of through hole 32, but signal pin 60 is inserted into through hole 32 through insulation sleeve 81. This configuration forms a coaxial line between upper barrel 62 to be described later and the inner wall surface of through hole 32.

Further, the metal constituting upper base part 30 is exposed on the inner wall surface of through hole 33, but power pin 70 is inserted into through hole 33 through insulation sleeve 82. This configuration can avoid contact of upper barrel 72 to be described later with the inner wall surface of through hole 33, and can prevent a short circuit between power pin 70 and upper base part 30.

Lower base part 40 also includes through holes 41, 42, and 43 penetrating in the up-down direction. Through hole 41 is paired with through hole 31 of upper base part 30 to form one through hole (first through hole in the present invention) penetrating base part B. Similarly, through hole 42 is paired with through hole 32 of upper base part 30 to form one through hole (second through hole in the present invention) penetrating base part B. Furthermore, through hole 43 is paired with through hole 33 of upper base part 30 to form one through hole (second through hole in the present invention) penetrating base part B.

Through holes 41, 42, and 43 are disposed corresponding to the number, arrangement, and/or the like of through holes 31, 32, and 33 of upper base part 30, that is, corresponding to the number, arrangement, and/or the like of terminals of the IC package. Then, ground pin 50 is disposed in through holes 31 and 41, signal pin 60 is disposed in through holes 32 and 42, and power pin 70 is disposed in through holes 33 and 43.

The lower side of ground pin 50 is inserted into through hole 41 and placed so that the end portion of lower plunger 54 is exposed below lower surface 45.

The lower side of ground pin 60 is inserted into through hole 42 and placed so that the end portion of lower plunger 64 is exposed below lower surface 45.

The lower side of power pin 70 is inserted into through hole 43 and placed so that the end portion of lower plunger 74 is exposed below lower surface 45.

Ground pin 50 is inserted into through hole 41 and placed so that lower barrel 53, which will be described later, is in contact with the inner wall surface of through hole 41.

Similarly to upper base part 30, the lower base part is conventionally formed of metal such as aluminum. In the present embodiment, in contrast, lower base part 40 is formed of an insulation resin member (insulator), and conductive film 46 formed of gold is formed on the surface of lower base part 40 including inner walls of through holes 41, 42, and 43. Conductive film 46 is formed on the surface of lower base part 40 and through holes 41, 42, and 43 by plating, for example.

Note that conductive film 46 may be placed, in through hole 41, only at a position electrically connecting upper base part 30, ground pin 50, and the wiring board together, and need not cover the entire inner surface of through hole 41. For example, conductive film 46 may be placed so that the upper and lower portions of lower barrel 53 are in contact with conductive film 46, in through hole 41 and in a position where lower barrel 53 of ground pin 50 is placed. Such a placement electrically connects conductive film 46 and ground pin 50 together, and thus, conductive film 46 need not be placed in an area in through hole 41 corresponding to the area between the upper and lower portions of lower barrel 53.

Conductive film 46 is preferably metal more inert toward oxygen than the metal constituting upper base part 30, such as aluminum, and is further preferably metal having a low resistance value. Conductive film 46 is, for example, gold, which is a noble metal, but may be any other equivalent metal.

Lower barrel 53 of ground pin 50 inserted into through hole 41 comes into contact with conductive film 46 formed on the inner wall surface of through hole 41. Conductive film 46 with which lower barrel 53 comes into contact is gold or the like less likely to oxidize, so that contact resistance at the contacting point does not increase, the resistance value can be reduced, and lower barrel 53 and conductive film 46 are electrically connected with each other with a low resistance value, which can keep ground potential of lower base part 40.

Further, signal pin 60 is inserted into through hole 32 through insulation sleeve 81 as described above, so that a coaxial line is also formed in through hole 42 between lower barrel 63 to be described later and conductive film 46 of the inner wall surface of through hole 42. This coaxial line provides an impedance-matched signal path and allows transmission of high-frequency electric signals, which can increase a data-transfer rate in IC socket 10.

Furthermore, power pin 70 is inserted into through hole 33 through insulation sleeve 82 as described above, so that, also in through hole 43, lower barrel 73 to be described later is configured not to be in contact with conductive film 46 of the inner wall surface of through hole 43. This can prevent a short circuit between power pin 70 and conductive film 46.

Note that, for through hole 43, it may be configured that conductive film 46 is not formed on the inner wall, as described in FIG. 3, which can avoid a short circuit between power pin 70 and conductive film 46 even when lower barrel 73 comes into contact with the inner wall surface of through hole 43.

(Contact Pin)

Terminals of the IC package are electrically connected to terminals of the wiring board through ground pin 50, signal pin 60, and power pin 70 respectively disposed in through holes 31 and 41, through holes 32 and 42, and through holes 33 and 43 of base part B (upper base part 30 and lower base part 40).

Ground pin 50 (first contact pin in the present invention) electrically connects a ground terminal of the IC package and a ground terminal of the wiring board together. Ground pin 50 includes upper plunger 51, upper barrel 52, lower barrel 53, lower plunger 54, a spring (not illustrated), and the like.

Upper barrel 52 is a cylindrical member extending in the up-down direction along through hole 31. The lower end portion of upper plunger 51 is inserted and fixed inside the upper end portion of upper barrel 52.

The upper end portion of upper plunger 51 is formed depending on the shape of the terminal of the IC package. For example, when the terminal is a solder ball, the upper end portion is formed in a crown shape as illustrated in FIGS. 2 and 3, and the solder ball makes contact with the inner side of the crown shape portion.

Lower barrel 53 is a cylindrical member extending in the up-down direction along through hole 41 and is connected to the lower end portion of upper barrel 52. Lower barrel 53 has a diameter larger than that of upper barrel 52 and houses a spring that biases lower plunger 54 downward. The upper end portion of lower plunger 54 is inserted inside the lower end portion of lower barrel 53 to be slidably held.

The lower end portion of lower plunger 54 is formed depending on the shape of the terminal of the wiring board. For example, when the terminal is a pad, the lower end portion is formed in a hemispherical shape as illustrated in FIGS. 2 and 3, and the pad makes contact with the tip portion of the hemispherical shape.

In ground pin 50, upper plunger 51, upper barrel 52, lower barrel 53, and lower plunger 54 are each formed of metal having electrical conductivity, and electrically connect the terminal of the IC package and the terminal of the wiring board together. For example, upper barrel 52 and lower barrel 53 are formed of a metal base-material, and a gold coating is formed on their surfaces. The coating is preferably metal inert toward oxygen, and is further preferably metal having a low resistance value, for example, gold, which is a noble metal, but may be any other equivalent metal.

Therefore, lower barrel 53 comes into contact with the inner wall surface of through hole 41 in ground pin 50, but the gold coating on the surface of lower barrel 53 comes into contact with conductive film 46 formed on the inner wall surface of through hole 41. The coating on the surface of lower barrel 53 and conductive film 46 are both gold, which is less likely to oxidize and has a low resistance value: therefore, contact resistance at the contacting point does not increase, and lower barrel 53 and conductive film 46 are connected with each other with a low resistance value, which can keep ground potential of lower base part 40.

Signal pin 60 (second contact pin in the present invention) electrically connects a signal terminal for signal transmission different from the ground terminal in the IC package and a signal terminal for signal transmission different from the ground terminal in the wiring board together. Similarly to ground pin 50, signal pin 60 includes upper plunger 61, upper barrel 62, lower barrel 63, lower plunger 64, a spring (not illustrated), and the like.

Further, power pin 70 (second contact pin in the present invention) electrically connects a power terminal for power supply different from the ground terminal in the IC package and a power terminal for power supply different from the ground terminal in the wiring board together. Similarly to ground pin 50, power pin 70 includes upper plunger 71, upper barrel 72, lower barrel 73, lower plunger 74, a spring (not illustrated), and the like.

In the present embodiment, signal pin 60 and power pin 70 are configured similarly to ground pin 50. Thus, detailed descriptions of signal pin 60 and power pin 70 are omitted, but signal pin 60 and power pin 70 are placed in through holes 32 and 33, respectively, while insulation sleeves 81 and 82 formed of an insulation material are placed on the outer peripheries of signal pin 60 and power pin 70.

Insulation sleeves 81 are placed at two positions of the upper and lower sides of the outer periphery of upper barrel 62 and fitted in through hole 32 as described in FIGS. 2 and 3. This avoids contact of signal pin 60 with through holes 32 and 42 (conductive film 46) and prevents signal pin 60 from coming off through holes 32 and 42.

Similarly to insulation sleeves 81, insulation sleeves 82 are placed at two positions of the upper and lower sides of the outer periphery of upper barrel 72 and fitted in through hole 33. This avoids contact of power pin 70 with through holes 33 and 43 (conductive film 46) and prevents power pin 70 from coming off through holes 33 and 43.

Note that ground pin 50, signal pin 60, and power pin 70 illustrated in FIGS. 2 and 3 are exemplary, and the shapes and sizes thereof can be appropriately changed depending on the shape and size of the terminal of the IC package, for example.

SUMMARY

As described above, in the present embodiment, IC socket 10 includes at least ground pin 50 and base part B (lower base part 40) including through hole 41 into which ground pin 50 is inserted so as to be in contact with the inner wall. Further, lower base part 40 is formed of an insulator, and conductive film 46 formed of metal inert toward oxygen is formed on the inner wall of through hole 41 in lower base part 40.

Ground pin 50 is in contact with conductive film 46 formed of metal inert toward oxygen in base part B (through hole 41 of lower base part 40). Conductive film 46 that is in contact with ground pin 50 is less likely to oxidize, so that contact resistance at the contacting point does not increase, the resistance value can be reduced, and ground pin 50 and conductive film 46 are electrically connected with each other with a low resistance value, which can keep ground potential of lower base part 40.

Specifically, in a case where a coating on a surface of lower barrel 53 of ground pin 50 and conductive film 46 are formed of gold, the resistance value is low, so that ground pin 50 and conductive film 46 are electrically connected with each other with low contact resistance, which can keep ground potential of lower base part 40.

Note that the aforementioned embodiments merely describe examples of implementations for practicing the present invention, and should not be construed as limiting the technical scope of the present invention. In other words, the present disclosure can be implemented in various forms without departing from the scope, or essential features thereof.

For example, in the present embodiment, base part B is constituted by upper base part 30 formed of metal (e.g., aluminum) on the IC package side and lower base part 40 formed of an insulation resin member (insulator) on the wiring board side, but the configuration is not limited thereto. For example, upper base part 30 and lower base part 40 around signal pin 60 and power pin 70 may be formed of metal (e.g., aluminum), and upper base part 30 and lower base part 40 around ground pin 50 may be formed of an insulation resin member (insulator).

In this case, a conductive film formed of metal inert toward oxygen may be formed on not only the inner wall of through hole 41 of lower base part 40 but also through hole 31 of upper base part 30. The conductive film is less likely to oxidize, so that contact resistance with ground pin 50 at the contacting point does not increase, the resistance value can be reduced, and ground pin 50 and conductive film 46 are electrically connected with each other with a low resistance value, which can keep ground potential of upper base part 30 and lower base part 40.

INDUSTRIAL APPLICABILITY

A socket and an inspection socket according to the present disclosure are each suitable for an IC socket for housing an electric component such as an IC package on a wiring board, for example. In particular, the socket and the inspection socket are suitable in a case where high-frequency electric signals are transmitted to increase a data-transfer rate in the IC package and the wiring board.

REFERENCE SIGNS LIST

10 IC socket
20 Frame part
21 Housing part
22 Guide part
30 Upper base part
31, 32, 33 Through hole
35 Upper surface
40 Lower base part
41, 42, 43 Through hole
45 Lower surface
50, 60, 70 Contact pin
51, 61, 71 Upper plunger
54, 64, 74 Lower plunger
81, 82 Insulation sleeve
B Base part

What is claimed is:

1. A socket configured to able of electrically connecting a first electric component and a second electric component together, the socket comprising:
   a first contact pin configured to be capable of electrically connecting a ground terminal of the first electric component and a ground terminal of the second electric component;
   a second contact pin configured to be capable of electrically connecting a terminal different from the ground terminal of the first electric component and a terminal different from the ground terminal of the second electric component; and
   a base part that includes a first base part on a side of the first electric component and a second base part on a side of the second electric component, the base part being provided with a first through hole into which the first contact pin is inserted so as to be in contact with an inner wall of the first through hole and a second through hole into which the second contact pin is inserted so as not to be contact with an inner wall of the second through hole, the first through hole and the second through hole penetrating through the first base part and the second base part, wherein the second base part is formed of an insulator, a conductive film is formed on the inner wall of the first through hole in the second base part, and the second through hole has a diameter larger than that of the first through hole and includes a through hole in which a conductive film formed of metal inert toward oxygen is formed on an inner surface and a through hole in which the conductive film is not formed and an inner surface exposed.

2. The socket according to claim 1, wherein
the conductive film is a conductive film formed of metal inert toward oxygen.

3. The socket according to claim 2, wherein
the first base part is formed of metal, and
the conductive film formed of metal that is more inert toward oxygen than the metal constituting the first base part is formed on the inner wall of the first through hole in the second base part.

4. The socket according to claim 1, wherein
the conductive film is formed of gold.

5. An inspection socket configured to be capable of use for inspecting an electric property of the first electric component, the inspection socket comprising
the socket according to claim 1.

* * * * *